United States Patent [19]

Obrecht et al.

[11] Patent Number: 4,959,989
[45] Date of Patent: Oct. 2, 1990

[54] FORCE MULTIPLYING PRESS

[75] Inventors: Robert E. Obrecht, Bloomfield Hills; Edward J. Waltonen, Southfield, both of Mich.

[73] Assignee: REO Hydraulic Pierce & Form, Detroit, Mich.

[21] Appl. No.: 296,607

[22] Filed: Jan. 13, 1989

Related U.S. Application Data

[63] Continuation-in-part of Ser. No. 204,249, Jun. 9, 1988, Pat. No. 4,916,932.

[51] Int. Cl.$^5$ .............................................. B21J 9/18
[52] U.S. Cl. ...................................... 72/450; 72/454; 72/443; 100/281
[58] Field of Search ............... 29/243.56, 751; 72/409, 72/407, 410, 414, 416, 452, 454, 449, 450, 451, 443; 100/281

[56] References Cited

U.S. PATENT DOCUMENTS

| | | | |
|---|---|---|---|
| 3,661,008 | 5/1972 | Richardson | 72/451 |
| 3,730,044 | 5/1973 | Sawdon | 83/513 |
| 3,871,225 | 3/1975 | Bachmann et al. | 72/454 |
| 3,919,876 | 11/1975 | Bakermans | 72/451 |
| 4,360,335 | 11/1982 | West | 100/281 |
| 4,434,646 | 3/1984 | Maeda et al. | 72/451 |
| 4,449,421 | 5/1984 | Olschewski et al. | 72/450 |
| 4,781,568 | 11/1988 | Inaba | 72/454 |

FOREIGN PATENT DOCUMENTS

| | | | |
|---|---|---|---|
| 400529 | 7/1909 | France | 72/450 |

OTHER PUBLICATIONS

BTM Corporation-Bulletin Nos. 47 and 31.1, "A New Breed of Power" & Operation of Press.

Primary Examiner—David Jones
Attorney, Agent, or Firm—Krass & Young

[57] ABSTRACT

A press for performing a work operation on a workpiece including a yoke defining a central bore, a ram mounted for reciprocal movement in the bore and carrying a fabricating tool on one end of the ram, an electric motor secured to an end wall of the yoke and having an output shaft passing through the end wall of the yoke, a ball screw driven by the output shaft of the motor and positioned in the bore of the yoke, a ball nut mounted in the bore on the ball screw, and a force multiplying mechanism interconnecting the ball nut and the ram and operative to move the ram to a preparatory position and thereafter multiply the force applied to the ram to facilitate the performance of the work operation. The force multiplying mechanism includes a linkage system interconnecting the nut and the ram and including a final link which moves into position in proximity of the line of action of the ram as the tool reaches its working position so that subsequent movement of the link toward the line of action multiplies the force exerted on the ram and thereby on the tool. The electric motor is an AC servo motor and and AC servo controller is provided for coaction with the motor to enable the motor to be precisely programmed to provide a predetermined number of revolutions to the ball screw so as to provide a predetermined desired forward stroking movement of the force multiplying mechanism.

35 Claims, 4 Drawing Sheets

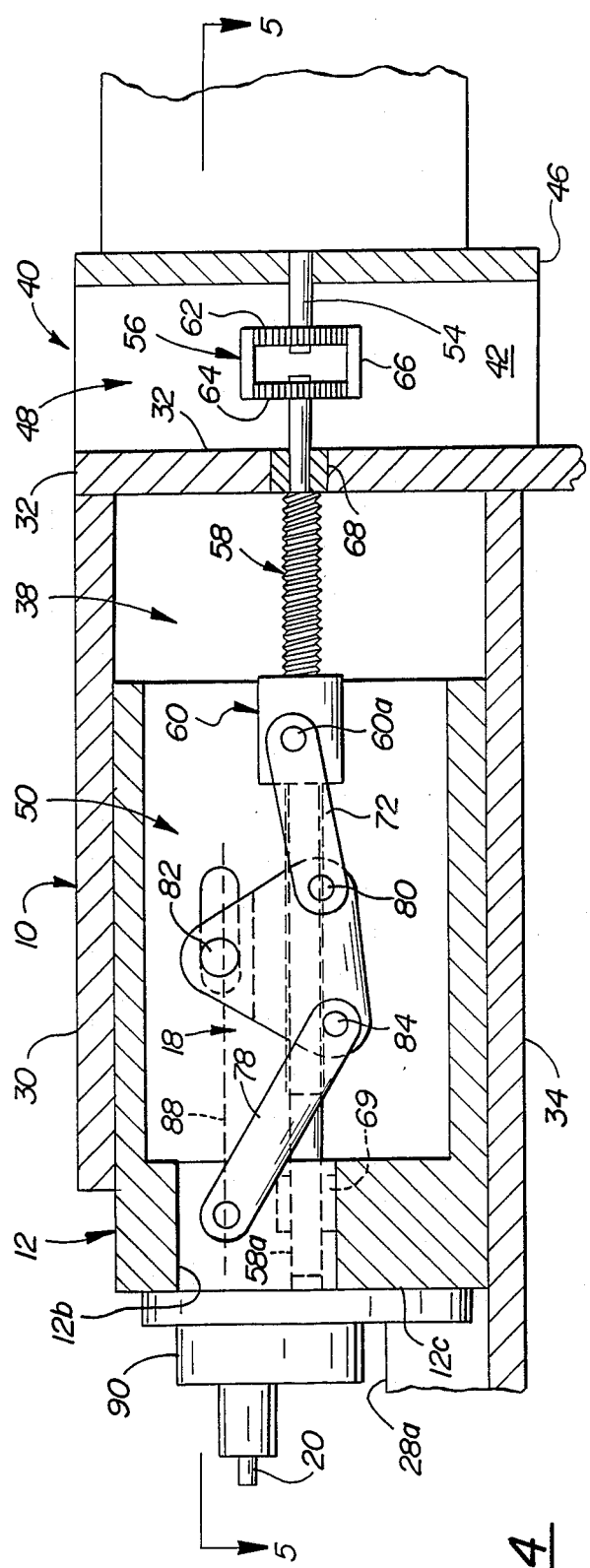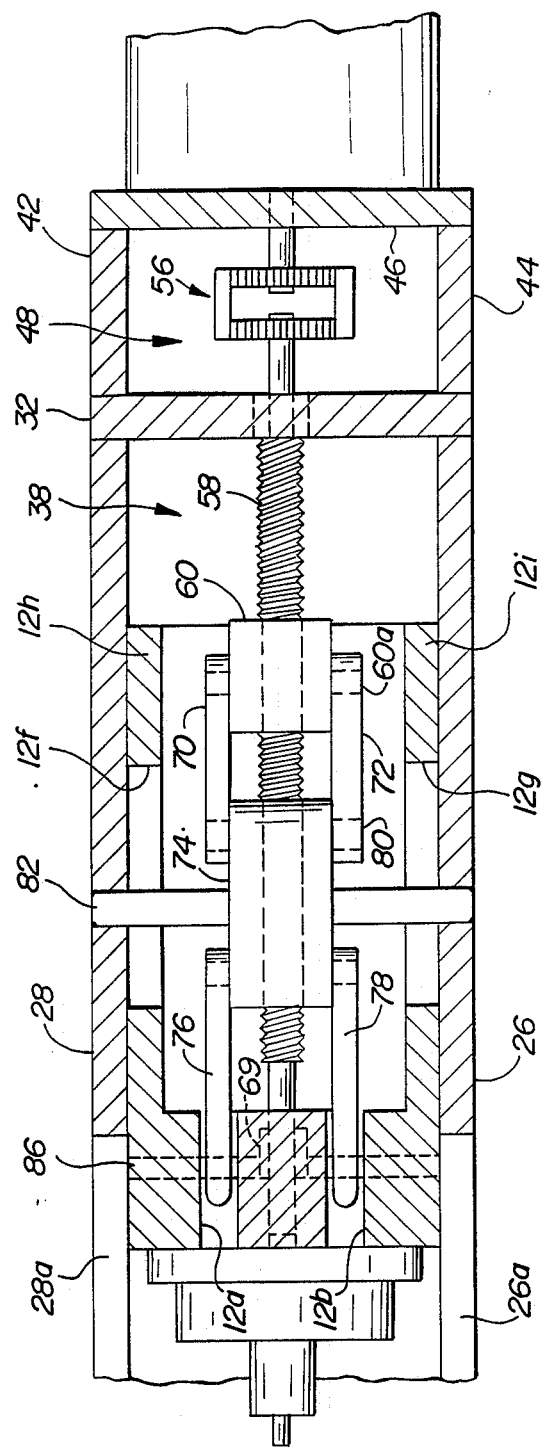
FIG. 4
FIG. 5

FORCE MULTIPLYING PRESS

RELATED APPLICATION

This application is a continuation-in-part of United States patent application Ser. No. 204,249 filed June 9, 1988, now U.S. Pat. No. 4,916,932.

BACKGROUND OF THE INVENTION

This invention relates to presses and more particularly to presses for performing a work operation on a workpiece.

Presses are commonly used in our industrial society for a myriad of mechanical fabricating operations such as piercing, punching, shape forming, resistance welding or the like. Various presses have been proposed and utilized to perform the various mechanical fabricating operations with the particular form and configuration of the press generally dictated by the particular application envisioned. Whereas a multitude of press designs have been proposed and in some cases commercially exploited, all of the prior art presses have had certain disadvantages. Generally, presses in which a large force is required to perform the desired fabrication operation have tended to be unduly large and cumbersome and, conversely, smaller, less cumbersome presses are unsatisfactory where a large force is required to perform the desired fabrication operation.

Various attempts have been made to provide a relatively small press capable of generating a relatively high force at the fabricating tool but the commercial application of these presses has been limited by problems related to leakage, durability and the like.

SUMMARY OF THE INVENTION

This invention is directed to the provision of a relatively small press capable of generating relatively large fabricating forces.

The invention press is usable in performing a work operation on a workpiece such for example as piercing, punching, shape forming or welding. The press of the invention includes a frame defining a bore; a ram slidably mounted in the bore and having a first end positioned within the bore and a free end projecting out of the bore; a fabricating tool mounted on the ram free end; an electric motor including an output shaft rotated in response to actuation of the motor; a drive member movable through power and return strokes in response to rotation of the output shaft; and a force multiplying mechanism interconnecting the drive member and the ram and operative in response to power stroking movement of the drive member to move the fabricating tool to a working position and thereafter multiply the force applied to the tool to facilitate the performance of the work operation. This arrangement allows a relatively small press to generate a relatively large force at the fabricating tool.

According to a further feature of the invention, the ram and the drive member are mounted for movement on parallel axes so that forward stroking movement of the drive member produces forward stroking movement of the ram and the force multiplying mechanism comprises a linkage system interconnecting the drive member and the ram and transmitting the forward stroking movement of the driver member to the ram. This arrangement provides a convenient and efficient means for effecting the force multiplying function.

According to a further feature of the invention, the linkage system includes a first link connected at one end thereof to a connection point on the ram and movable in response to forward stroking movement of the piston from a rest position, in which the other end thereof is displaced from a line of action parallel to the axes of the ram and drive member and passing through the connection point on the ram, to a working position in which the other end of the link is proximate the line of action. This arrangement provides a ready and efficient means of multiplying the force applied to the ram as the link approaches the line of action.

According to a further feature of the invention, the linkage system further includes a second link pivoted at a first point thereon about an axis positioned on the line of action and fixed with respect to the frame and pivotally connected at a second point thereon to the other end of the first link. This arrangement provides a convenient means of transmitting the force from the drive member to the force multiplying link.

According to a further feature of the invention, the linkage system further includes a third link pivoted at one end thereof to the drive member and pivoted at the other end thereof to a third point on the second link. This arrangement further facilitates the transmittal of motion and power from the drive member to the force multiplying link.

According to a further feature of the invention, the first, second and third points on the second link are triangulated. This specific geometric configuration further optimizes the efficiency of the linkage system.

According to a further feature of the invention, the second link has a triangular configuration with the first, second and third points positioned respectively at the three corners thereof.

According to a further feature of the invention, the motor comprises a power cylinder including a piston and a piston rod; the output shaft of the press is constituted by the piston rod of the power cylinder; and the drive member is mounted on the free end of the piston rod. This arrangement allows the motor to be utilized to precisely and programmably control the movement of the force multiplying linkage through its various positions.

According to a further feature of the invention, the press further includes control means operative to initially energize the motor in a high speed sense, whereby to move the force multiplying mechanism rapidly from its rest position to its preparatory position and thereby move the tool from its rest position to its preparatory position, and thereafter energize the motor in a slow speed sense, whereby to move the force multiplying mechanism to its final force multiplied position and thereby move the tool to its final position to perform the work operation. This arrangement allows the force multiplying mechanism to quickly move to its preparatory position whereafter the force may be dramatically increased to perform the desired work operation.

According to a further feature of the invention, the press further includes a screw drivingly connected to the output shaft of the electric motor and the drive member comprises a nut mounted on the screw. This arrangement provides a convenient and efficient means of transmitting the rotary motion of the output shaft of the electric motor to forward linear movement of the force multiplying mechanism.

According to a further feature of the invention, the screw is a ball screw and the nut is a ball nut. This specific arrangement further facilitates the efficient conversion of the rotational movement of the output shaft of the electric motor to forward linear movement of the force multiplying mechanism.

According to a further feature of the invention, the electric motor is a brushless AC servo motor and the control means to the servo motor comprises a servo controller capable of being programmed to initially energize the motor in a first sense to provide a high speed operational mode to quickly move the force multiplying mechanism from its rest position to its preparatory position and thereafter energize the motor in a low speed sense to move the force multiplying mechanism from its preparatory position to its final working position.

According to a further feature of the invention, the control means of the motor is capable of being programmed to count the revolutions of the motor and provide a predetermined number of revolutions corresponding to a predetermined desired travel for the force multiplying mechanism. With this arrangement, the control can be programmed to provide a predetermined number of revolutions of the motor corresponding to the required distance of movement of the force multiplying mechanism for a particular application and can be readily reprogrammed to provide a different number of revolutions corresponding to the requirements of a different application.

BRIEF DESCRIPTION OF THE DRAWINGS

FIG. 4 is a further, somewhat simplified longitudinal cross-sectional view of the invention press;

FIG. 5 is a cross-sectional view taken on line 5-5 of FIG. 4;

DETAILED DESCRIPTION OF THE PREFERRED EMBODIMENT

Figure 1:
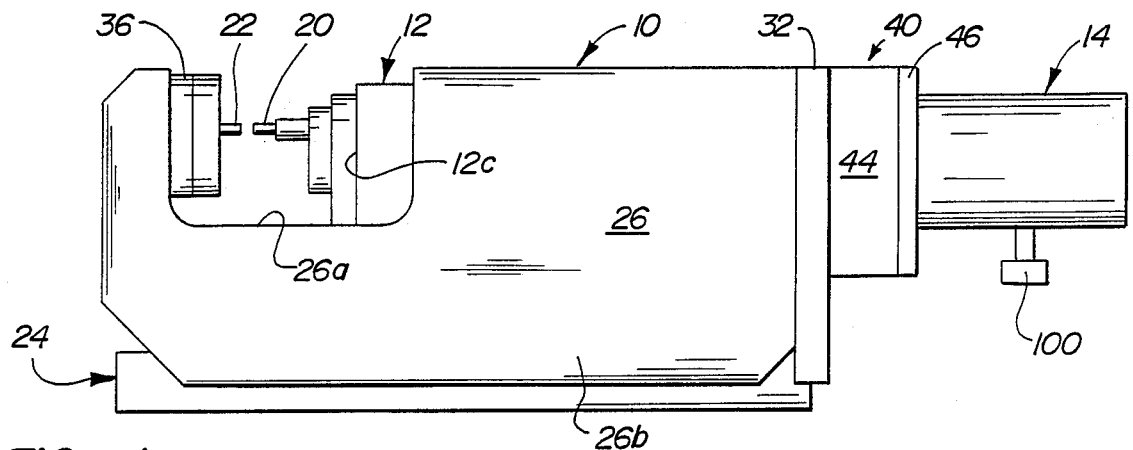
FIG. 1 is a side elevational view of a press according to the invention.
Figure 3:
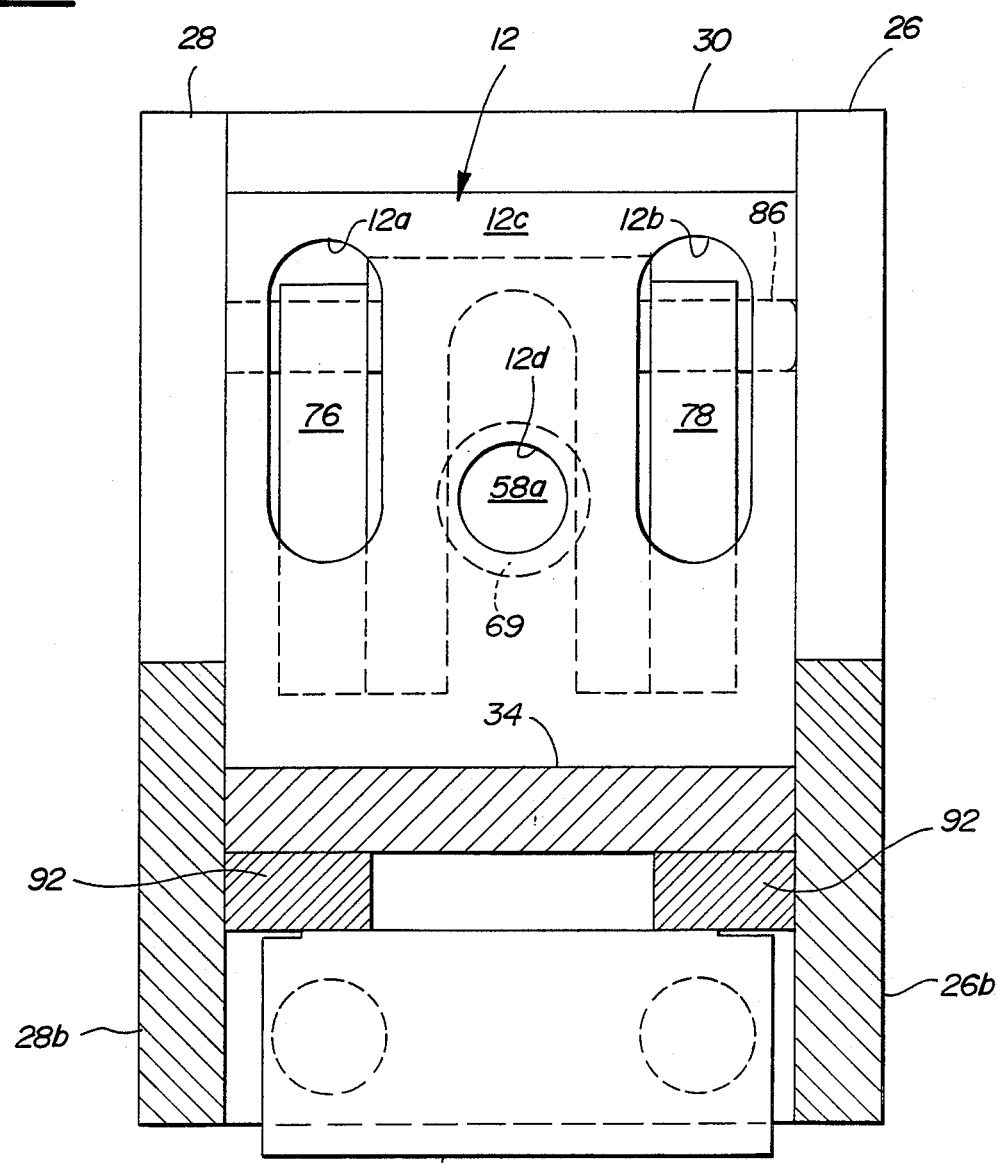
FIG. 3 is a view looking in the direction of the arrow 3 of FIG. 2.

The invention press, broadly considered, comprises a yoke or frame 10, a ram 12, an electric motor 14, a drive member 16, a force multiplying mechanism 18, first and second fabricating tools 20 and 22, and a base 24.

Yoke 10 is formed of steel plates and has a cage configuration with a generally C-shape in longitudinal cross section. Yoke 10 includes generally C-shaped side plates 26 and 28, a top plate 30, a rear end plate 32, a bottom plate 34, and a die retainer plate 36. Plates 26, 28, 30, 32, 34 and 36 are suitably joined together, as for example by bolting, to form a C-shaped cage structure defining a generally rectangular blind bore 38 opening adjacent the forward end of the yoke and closed at its rearward end by rear end plate 32. Side plates 26 and 28 will be seen to include cutouts 26a and 28a defining the C-configuration of the plates and will be seen to extend downwardly below bottom plate 34 to form skirt portions 26b and 28b.

An auxiliary cage structure 40 is suitably secured to the rear end of the yoke. Cage structure 40 may include for example side plates 42 and 44 and end plate 46 suitably secured to each other and suitably secured to the rear face of end plate 32 of the yoke so as to define an open rear chamber 48.

Ram 12 is formed as a monolithic rectangular steel block with a cross-sectional configuration conforming to the cross-sectional configuration of bore 38 so that ram 12 may reciprocate smoothly within bore 38. Ram 12 is selectively hollowed out along its axial length to provide a central chamber 50 opening at the rear face of the ram and parallel core passages 12a and 12b extending axially forwardly from the forward end of chamber 50 and opening in the front face 12c of the ram. Ram 12 further includes an axial bore 12d positioned between core passages 12a and 12b and extending forwardly from chamber 50 to the front face 12c of the ram; a bore 12e extending transversely of the ram and passing through core passages 12a and 12b, and a pair of parallel axially extending slots 12f and 12g defined respectively in the side wall portions 12h and 12i of the ram in horizontal alignment with transverse bore 12e.

Motor 14 comprises a brushless AC servo motor such for example as the type available from Rexroth Indramat of Woodale, Illinois as Part No. MAC90-COKD-2X-100-A. Motor 14 is suitably secured to the rear exterior face of cage plate 46 and includes an output shaft 54 extending forwardly and passing through plate 46 for entry into chamber 48.

Drive mechanism 16 includes a coupling 56, a ball screw 58 and a ball nut 60. Coupling 56 may comprise a taper lock chain coupling of the type available from Dodge Manufacturing Corporation of Michawa, Indiana as Part No. 4016 TYPE HF and includes a first sprocket member 62 secured to the forward end of motor output shaft 54, a second sprocket member 64 secured to the rearward end of ball screw 58, and a double chain 66 comprising a double width standard precision chain and extending around and in driving engagement with sprocket 62 and 64 so as to drivingly couple the output shaft 54 of motor 14 to the rear end of ball screw 58. Ball screw 58 is journaled at its rearward end by bearings 68 provided in yoke end wall 32 and extends forwardly through bore 38 of yoke 10 and through central chamber 50 of the ram 12 for journaling receipt at its forward end 58a in a bushing 69 positioned in bore 12d of the ram.

Ball nut 60 has a generally rectangular configuration and includes trunions 60a extending from opposite side faces of the nut. Ball screw 58 and ball nut 60 may for example be of the recirculating ball type including, in known manner, balls which roll along arch-shaped ball running grooves in the ball screw and in the nut and arranged, after running several times around the shaft, to be passed through a ball tube incorporated in the nut so as to be recirculated. Ball screw 58 and ball nut 60 may for example be of the type available from THK Co. Ltd. of Tokyo, Japan as Assembly No. BSF2510B. It will be understood that rotation of motor output shaft 54 acts through the intermediary of coupling 56 to rotate ball screw 58 which in turn causes ball nut 60 to move linearly along the ball screw.

Force multiplying mechanism 18 includes a first link means comprising a pair of links 70 and 72, second link means comprising a link 74, and third link means comprising a pair of links 76 and 78. Links 70 and 72 are generally straight and are each journaled at their rearward ends on a respective trunion 60a of ball nut 60 and pivotally secured at their forward ends to link 74 by pivot pins 80 carried by link 74 adjacent one corner of the link.

Link 74 has a generally triangular configuration and has a bifurcated construction, including spaced side walls 74a and 74b, for passage of ball screw 58. A fixed shaft 82 extends fixedly between side walls 26 and 28 of yoke 10 for passage through slots 12f and 12g in the side walls of the ram and for pivotal passage through the upper solid apex of triangular member 74. Member 74 further includes pivot pins 84 at the third apex of the member.

Links 76 and 78 are generally straight and are respectively pivotally secured at their rearward ends to pivot pins 84 and extend at their forward ends into the respective core passages 12a and 12b of the ram for pivotal mounting at their forward ends on a pivot shaft 86 extending transversely of the forward end of the ram within transverse bore 12e. The center of shafts 82 and 86 define a line of action 88 parallel to the central longitudinal axis of ball screw 58.

Fabricating tool 20, which may comprise for example a punch, is mounted on an adapter member 90 suitably secured to the forward end of ram 12 in overlying relation to core passages 12a and 12b, and fabricating tool 22, which may comprise for example a collet, is suitably secured to the rearward face of die retainer plate 36 in aligned relation to punch 20 so as to coact with punch 20 to perform a punching operation on a workpiece positioned therebetween in response to actuation of motor 14.

Yoke 10 is suitably mounted on base member 24 for reciprocal movement relative to the base member with linear bearings 92 interposed between base 24 and the lower face of yoke bottom plate 34 to facilitate the smooth reciprocal movement of yoke 10 on base 24 so that the invention press may operate in a self-equalizing manner upon actuation of motor 14 to apply equal forces to the opposite sides of a workpiece positioned between fabricating tools 20 and 22 to avoid undesirable inelastic deformation of the workpiece during the work operation performed by the fabricating tools 20 and 22. Further details of the manner in which yoke 10 may be mounted on base 24, as well as further details of the manner in which the yoke 10 coacts with the base 24 to facilitate a self-equalizing work operation, are disclosed in U.S. Pat. No. 4,716,803, assigned to the assignee of the present application as well as in United States patent application Ser. No. 859,016 filed on May 2, 1986 and also assigned to the assignee of the present application.

Figure 2:
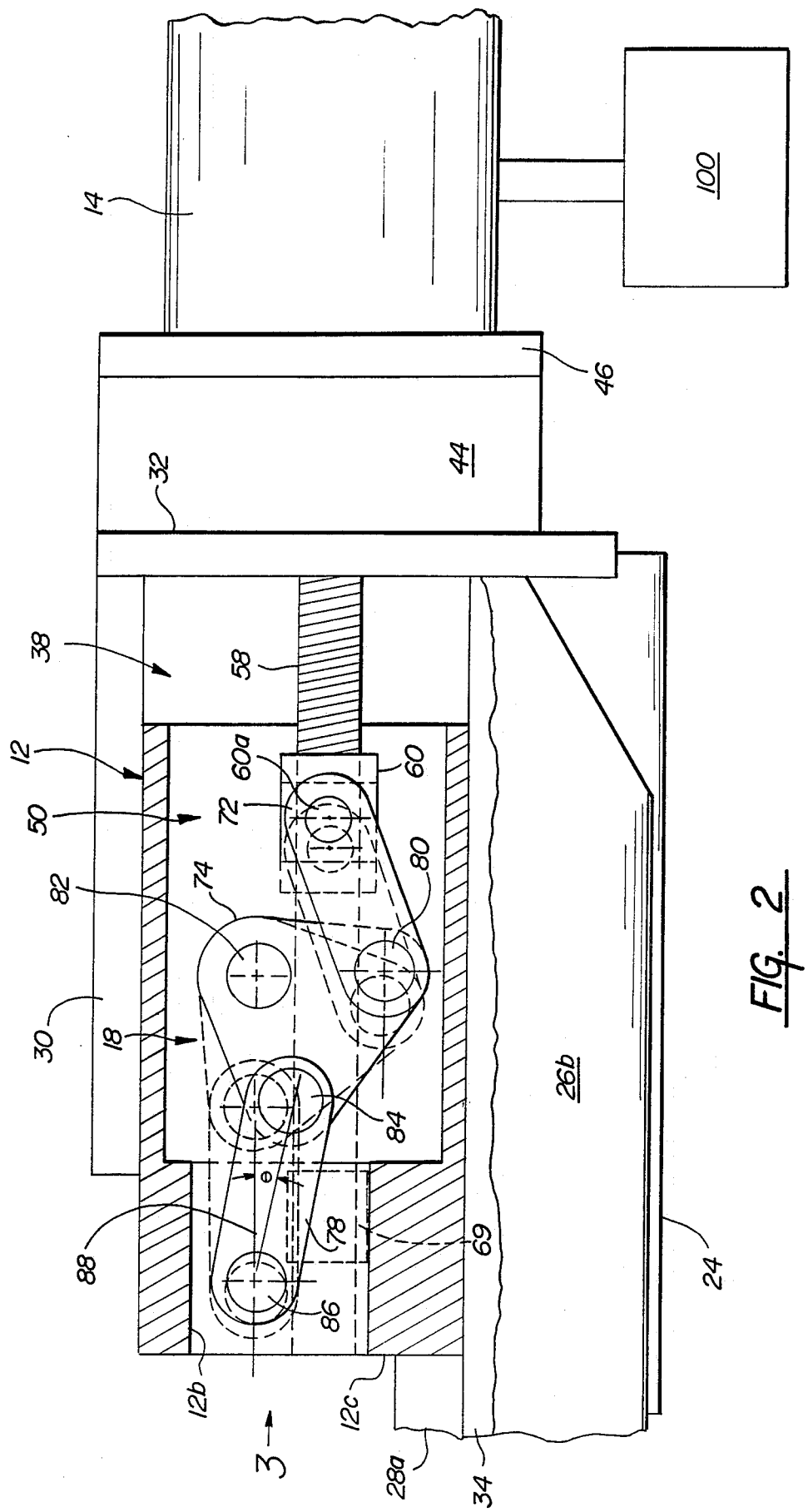
FIG. 2 is a fragmentary longitudinal cross-sectional view of the press of FIG. 1 with the fabricating tools removed for purposes of clarity.
Figure 6:
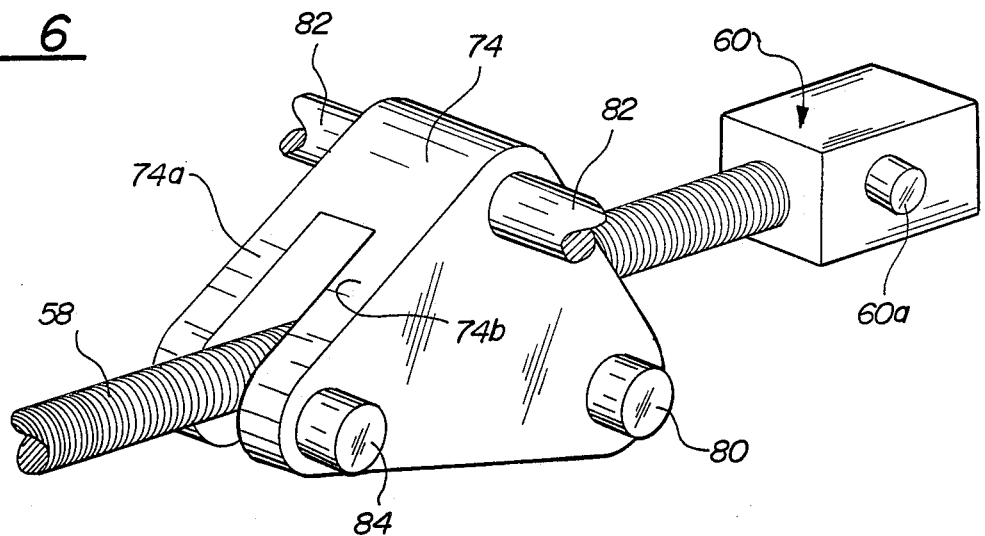
FIG. 6 is a perspective fragmentary view of a portion of the force multiplying mechanism of the invention press.
Figure 7:
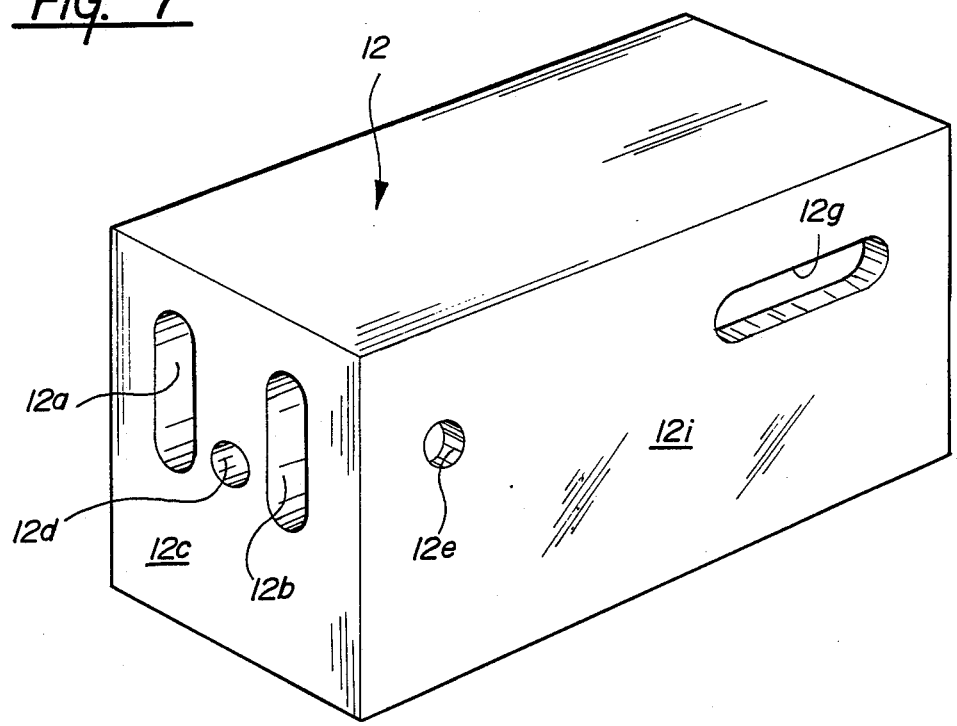
FIG. 7 is a perspective view of a ram utilized in the invention press.

In the operation of the invention press, the force multiplying mechanism, in response to actuation of motor 14, moves from the retracted or rest position seen in FIGS. 4 and 5 to a preparatory position indicated by the solid line position of the force multiplying mechanism in FIG. 2, and thereafter moves to a final position as seen in the dotted line position seen of FIG. 2. The initial forward stroking movement of the force multiplying mechanism, and the vast majority of the forward stroking movement, accomplishes a gross or macro movement of the fabricating tool 20 into a preparatory position relative to fabricating tool 22 and relative to a workpiece positioned therebetween, and the final forward stroking movement of the force multiplying mechanism accomplishes a micro movement of the tool 20 to its final position while acting to multiple the force supplied to the fabricating tool to facilitate the performance of the work operation.

Specifically, with the force multiplying mechanism in the rest or retracted position of FIGS. 4 and 5, the rear ends of links 76 and 78 are grossly displaced relative to the line of action 88 passing through pins 82 and 86. As ball screw 60 begins its forward stroking movement in response to actuation of motor 14, links 70, 72 move forwardly to pivot triangular link 74 about the axis of fixed pin 82 to move links 76,78 forwardly in a manner to move the ram forwardly through the intermediary of pin 86 and thereby move the fabricating tool 20 to its preparatory position. The various parts are configured and designed such that the tool 20 arrives at its preparatory position relative to the workpiece at such time as links 76,78 assume an angle $\theta$ with respect to line of action 88 of approximately 7°. Further forward stroking movement of the ball nut 60 has the effect of multiplying the force exerted at the tool 20 as the center of pivot pins 84 moves closer and closer to the line of action 88. Preferably, the center of pins 84 never quite reaches the line of action 88 but rather has a final disposition in which links 76,78 assume an approximately 1° angular disposition with respect to line of action 88. The force applied to tool 20 and thereby to the workpiece may thereby be multiplied by a factor, for example, of from 20 to 4 times so that a relatively small magnitude of torque applied by motor 14 has the effect of applying an extremely large force at the tool 20 to perform even extremely heavy-duty fabricating operations. As indicated, the invention press is preferably arranged and designed to operate in a self-equalizing manner so that the forces exerted on the workpiece by fabricating tools 20 and 22 are essentially equal but the invention press may also be operated without the force equalizing feature.

According to a further important feature of the invention, control means are provided for motor 14 which enables the motor to operate in conjunction with the force multiplying mechanism 18 so as to precisely position the fabricating tool 20 relative to the fabricating tool 22 in response to a predetermined input signal to the motor. For example, control means may be provided to initially energize the motor in a relatively high speed sense so as to move the motor rapidly from its rest or retracted position to its preparatory position whereafter the motor may be energized in a relatively low speed mode to move the force multiplying mechanism from its preparatory position to its force multiplying position. The control means 100 provided in conjunction with motor 14 may for example comprise a pulse width modulation servo controller of the type available from Rexroth Indramat as TDMAC servo controller Part No. MAC90-COKD-2X-100-A-O. Controller 100 is capable of being programmed, for example, to provide a specified number of revolutions of servo motor 14 so that, given the known axial distance the ball nut moves in response to each rotation of the ball screw, a predetermined amount of forward movement of tool 20 relative to tool 22 may be programmed simply by programming controller 100 to provide a predetermined number of revolutions of the motor. The motor may be operated at a constant speed during the entire movement of the force multiplying mechanism from its rest position and through its preparatory position to its final force multiplied position but, preferably, controller 100 is programmed to provide a two-part movement of the force multiplying mechanism wherein the initial movement of the force multiplying mechanism from its rest to its preparatory position is at a relatively high speed and the final movement from its preparatory to its force multiplied position is at a relatively low speed. For example, in a typical application, the ball nut moves three inches between its retracted and preparatory positions and .06 inches between the preparatory and final force multiplied position of the force multiplying mechanism and the motor is programmed to move the ball nut at 180 inches per minute during the movement of the ball screw from its retracted to its preparatory position and to thereafter move the ball screw at two inches per minute during the movement of the force multiplying mechanism from its preparatory to its final force multiplied position. With these parameters, and allowing for acceleration and deceleration times, the movement of the force multiplying mechanism from its rest to its preparatory position requires 1.3 seconds and the movement of the force multiplying mechanism from its preparatory to its final force multiplied position requires 1.8 second for a total cycle time of 3.1 seconds.

The invention press will be seen to provide a compact and efficient mechanism for applying a large force to a fabricating tool to perform even heavy-duty work operations while requiring only a relatively small and readily available electrical energy input at the actuation end of the press. For example, the invention press may be designed so that a force of 600 lbs. provided at ball nut 60 in response to rotation of the ball screw will result in the application of a force of 12000 lbs. at the tool 20.

Whereas a preferred embodiment of the invention has been illustrated and described in detail it will be apparent that various changes may be made in the disclosed embodiment without departing from the scope or spirit of the invention.

We claim:

1. A press for performing a work operation on a workpiece, said press comprising:
   a frame defining a bore having an axis;
   a ram slidably mounted in said bore for movement along said axis and having a first end positioned within said bore and a free end;
   a first fabricating tool mounted on said ram free end;
   an electric motor including an output shaft rotated in response to actuation of said motor;
   a drive member movable along an axis parallel to said bore axis through power and return strokes in response to rotation of said output shaft; and
   a force multiplying mechanism interconnecting said drive member and said ram and operative in response to power stroking movement of said drive member to move said fabricating tool to a preparatory position and thereafter multiply the force applied to said tool to facilitate the performance of the work operation.

2. A press according to claim 1 wherein:
said press further includes a screw drivingly connected to said electric motor output shaft; and
said drive member comprises a nut mounted on said screw.

3. A press according to claim 2 wherein:
said screw is a ball screw and said nut is a ball nut.

4. A press according to claim 3 wherein:
said electric motor is an electric servo motor.

5. A press for performing a work operation on a workpiece, said press comprising:
a frame defining a bore having an axis;
a ram slidably mounted in said bore for movement along said axis and having a first end positioned within said bore and a free end;
a first fabricating tool mounted on said ram free end;
an electric motor including an output shaft rotated in response to actuation of said motor;
a drive member movable along an axis parallel to said bore axis through power and return strokes in response to rotation of said output shaft; and
a force multiplying linkage system interconnecting said drive member and said ram and operative in response to forward power stroking movement of said drive member to move said fabricating tool forwardly to a preparatory position thereafter to multiply the force applied to said tool to facilitate the performance of the work operation.

6. A press according to claim 5 wherein:
said linkage system includes a first link connected at one end thereof to a connection point on said ram and movable to response to a forward stroking movement of said piston from a preparatory position in which the other end thereof is displaced from a line of action parallel to said axes and passing through said connection point to a final position in which said other end thereof is proximate said line of action.

7. A press according to claim 6 wherein:
the center line of said bore and the center line of said output shaft lie of a common axis and said line of action is parallel to said common axis.

8. A press according to claim 7 wherein said press further includes:
a base member mounting said frame member for reciprocal movement thereon.

9. A press according to claim 7 wherein:
said frame further includes a portion positioned in confronting relation to the forward stroking movement of said ram; and
said press further includes a second fabricating tool mounted on said frame portion in confronting alignment with said first fabricating tool so as to coact with said first fabricating tool to perform a work operation on a workpiece positioned therebetween in response to forward stroking movement of said ram.

10. A press according to claim 6 wherein:
said linkage system further includes a second link pivoted at a first point thereon about an axis positioned on said line of action and fixed with respect to said frame and pivotally connected at a second point thereon to said other end of said first link.

11. A press according to claim 10 wherein:
said linkage system further includes a third link pivoted at one end thereof to said drive member and pivoted at the other end thereof to a third point on said second link.

12. A press according to claim 11 wherein:
said first, second and third points on said second link are triangulated.

13. A press according to claim 12 wherein:
said second link has a triangular configuration with said first, second and third points positioned respectively at the three corners thereof.

14. A press for performing a work operation on a workpiece, said press comprising:
(A) a yoke defining a bore open at one end and closed at its other end by an end wall of said yoke;

(B) a ram slidably mounted in said bore with a first end positioned within said bore and a second free end projecting out of said bore;
(C) a fabricating tool mounted on the free end of said ram;
(D) an electric motor mounted exteriorly of said yoke and including an output shaft extending through said end wall and into said bore;
(E) a screw driven by said output shaft;
(F) a nut mounted on said screw and movable through power and return strokes in response to powering of said output shaft upon actuation of said motor; and
(G) a force multiplying mechanism interconnecting said nut and said ram and operative in response to power stroking movement of said nut to move said fabricating tool to a preparatory position and thereafter multiply the force supplied to said fabricating tool to facilitate and performance of the work operation.

15. A press according to claim 14 wherein:
(H) said screw is a ball screw and said nut is a ball nut.

16. A press according to claim 14 wherein:
(H) said ram and said nut are mounted for movement on parallel axes so that forward stroking movement of said nut produces forward stroking movement of said ram; and
(I) said force multiplying mechanism comprises a linkage system interconnecting said nut and said ram and transmitting the forward stroking movement of said drive member to said ram.

17. A press according to claim 16 wherein:
(J) said linkage system includes a first link connected at one end thereof to a connection point on said ram and movable in response to forward stroking movement of said drive member from a preparatory position, in which the other end thereof is displaced from a line of action parallel to said axes and passing through said connection point, to a final position in which said other end thereof is proximate said line of action.

18. A press according to claim 17 wherein:
(K) said linkage system further includes a second link pivoted at a first point thereon about an axis positioned on said line of action and fixed with respect to said yoke and pivotally connected at a second point thereon to said other end of said first link.

19. A press according to claim 18 wherein:
(L) said linkage system further includes a third link pivoted at one end thereof to said drive member and pivoted at the other end thereof to a third point on said second link.

20. A press according to claim 19 wherein:
(M) said first, second and third points on said second link are triangulated.

21. A press according to claim 20 wherein:
(N) said second link has a triangular configuration with said first, second and third points positioned respectively at the three corners thereof.

22. A press according to claim 21 wherein:
(O) said electric motor is a servo motor.

23. A press according to claim 22 wherein:
(P) the center line of said bore and the center line of said motor lie on a common axis and said line of action is parallel to said common axis.

24. A press performing a work operation comprising:
a fabricating tool;
a motor having a rotatable output shaft;
a force multiplying mechanism drivingly connected to said tool and including a rest position corresponding to a rest position of said tool, a preparatory position corresponding to a preparatory position of said tool, and a force multiplying position corresponding to a final position of said tool in which the work operation has been completed;
drive means interconnected between said output shaft and said force multiplying means and operative in response to rotation of said output shaft to move said force multiplying mechanism from its rest position to its preparatory position and thereafter to its final position; and
control means operative to initially energize said motor in a high speed sense to move said force multiplying mechanism rapidly from its rest position to its preparatory position and thereby move said tool form its rest position to its preparatory position and thereafter energize said motor in a slow speed sense to move said force multiplying mechanism to its force multiplying position and thereby move said tool to its final position.

25. A press according to claim 24 wherein:
said control means is operative to impart a predetermined number of revolutions to said output shaft corresponding to the number of revolutions required to move said force multiplying mechanism from its rest position to its final position.

26. A press according to claim 24 wherein:
said motor comprises an electric motor.

27. A press according to claim 26 wherein:
said electric motor is a servo motor; and
said control means comprises a servo controller.

28. A press according to claim 26 wherein:
said press further includes a frame defining a bore and a ram slidably mounted in said bore and having a first end positioned within said bore and a free end projecting out of said bore;
said drive means includes a drive member movable through power and return strokes in response to energization of said motor;
said tool is carried on said ram free end; and
said force multiplying mechanism is interconnected between said drive member and said ram.

29. A press according to claim 28 wherein:
said drive means further includes a screw drivingly connected to the output shaft of said electric motor; and
said drive member comprises a nut mounted on said screw.

30. A press according to claim 29 wherein:
said screw is a bal screw and said nut is a ball nut.

31. A press for performing a work operation comprising:
a fabricating tool;
an electric motor having a rotatable output shaft;
a force multiplying mechanism drivingly connected to said tool and including a rest position corresponding to a rest position of said tool, a preparatory position corresponding to a preparatory position of said tool, and a force multiplying position corresponding to a final position of said tool in which the work operation has been completed;
drive means interconnected between said output shaft and said force multiplying means and operative in response to rotation of said output shaft to move said force multiplying mechanism from its rest position to tis preparatory position and thereafter to its final position; and control means operative to selectively control the rotation of said output shaft so as to selectively control the movement of said force multiplying mechanism from its rest position to its preparatory position to its final position;

said press further including a frame defining a bore and a ram slidably mounted in said bore and having a first end positioned within said bore and a free end;

said drive means including a screw drivingly connected to the output shaft of said electric motor and a nut mounted on said screw and movable through power and return strokes in response to energization of said motor;

said tool being carried on said ram free end;

said ram and said nut being mounted for movement on parallel axes so that forward stroking movement of said nut produces forward stroking movement of said ram; and said force multiplying mechanism being interconnected between said nut and said ram and comprising a linkage system including a first link connected at one at one end thereof to a connection point on said ram and movable in response to forward stroking movement of said ram from a preparatory position in which the other end thereof is displaced from a line of action parallel to said axes and passing through said connection point to a final position in which said other end thereof is proximate said line of action.

32. A press according to claim 31 wherein:

said linkage system further includes a second link pivoted at a first point thereon about an axis positioned on said line of action and fixed with respect to said frame and pivotally connected at a second point thereon to said other end of said first link.

33. A press according to claim 32 wherein:

said linkage system further includes a third link pivoted at one end thereof to said nut and pivoted at the other end thereof to a third point on said second link.

34. A press according to claim 33 wherein:

said first, second and third points on said second link are triangulated.

35. A press according to claim 34 wherein:

said second link has a triangular configuration with said first, second and third points positioned respectively at the three corner thereof.

* * * * *